(12) United States Patent
Zhao et al.

(10) Patent No.: US 12,223,336 B2
(45) Date of Patent: Feb. 11, 2025

(54) EDGE NETWORK COMPUTING SYSTEM WITH DEEP REINFORCEMENT LEARNING BASED TASK SCHEDULING

(71) Applicant: Intelligent Fusion Technology, Inc., Germantown, MD (US)

(72) Inventors: Qi Zhao, Germantown, MD (US); Yi Li, Germantown, MD (US); Mingjie Feng, Germantown, MD (US); Li Li, Germantown, MD (US); Genshe Chen, Germantown, MD (US)

(73) Assignee: Intelligent Fusion Technology, Inc., Germantown, MD (US)

( * ) Notice: Subject to any disclaimer, the term of this patent is extended or adjusted under 35 U.S.C. 154(b) by 688 days.

(21) Appl. No.: 17/490,861

(22) Filed: Sep. 30, 2021

(65) Prior Publication Data

US 2023/0153124 A1 May 18, 2023

(51) Int. Cl.
*G06F 9/445* (2018.01)
*G06F 9/48* (2006.01)

(52) U.S. Cl.
CPC ........ *G06F 9/44594* (2013.01); *G06F 9/4806* (2013.01); *G06F 2209/509* (2013.01)

(58) Field of Classification Search
None
See application file for complete search history.

(56) References Cited

U.S. PATENT DOCUMENTS

| | | | | |
|---|---|---|---|---|
| 6,970,261 B1* | 11/2005 | Robles | ........ | G06F 3/1217 |
| | | | | 358/1.14 |
| 11,206,221 B1* | 12/2021 | Guo | ........ | H04L 47/527 |
| 11,812,518 B2* | 11/2023 | Foukas | ........ | H04W 88/12 |
| 2009/0187907 A1* | 7/2009 | Shimizu | ........ | G06F 9/505 |
| | | | | 718/101 |
| 2021/0342200 A1* | 11/2021 | Gupta | ........ | G06F 1/08 |
| 2021/0400770 A1* | 12/2021 | Liu | ........ | H04W 76/10 |

OTHER PUBLICATIONS

Chao Qiu et al, "Networking Integrated Cloud-Edge-End in IoT: A Blockchain-Assisted Collective Q-Learning Approach", IEEE Internet of Things Journal, vol. 8, No. 16, Aug. 15, 2021 (Year: 2021).*

* cited by examiner

*Primary Examiner* — Meng Ai T An
*Assistant Examiner* — Zujia Xu
(74) *Attorney, Agent, or Firm* — ANOVA LAW GROUP, PLLC

(57) ABSTRACT

An edge network computing system includes: a plurality of terminal devices; a plurality of edge servers connected to the terminal device through an access network; and a plurality of cloud servers connected to the plurality of edge servers through a core network. Each edge server is configured to: receive a plurality of computing tasks originated from one of the plurality of terminal devices; use a deep Q-learning neural network (DQN) with experience replay to select one of the plurality of could servers to offload a portion of the plurality of computing tasks; and send the portion of the plurality of computing tasks to the selected cloud server and forward results of the portion of the plurality of computing tasks received from the selected cloud server to the originating terminal device.

14 Claims, 2 Drawing Sheets

EDGE NETWORK COMPUTING SYSTEM WITH DEEP REINFORCEMENT LEARNING BASED TASK SCHEDULING

GOVERNMENT RIGHTS

The present disclosure was made with Government support under Contract No. W912CG21P0001, awarded by United States Army. The U.S. Government has certain rights in the present disclosure.

FIELD OF THE DISCLOSURE

The present disclosure generally relates to the field of network computing and, more particularly, relates to an edge network computing system with a deep reinforcement learning based task scheduling.

BACKGROUND

Computing at network edge is a new distributed computing paradigm which brings computation and data storage closer to the location where they are needed to improve response time and save bandwidth in a dynamic networking environment. Despite improvements in network technology, data centers are still unable to guarantee acceptable transfer rates and response time, which are critical requirements for most applications. An objective of the edge network computing is to move the computation and data storage away from the data centers towards the edge of a network, exploiting smart devices, mobile phones, computer terminals or network gateways to perform tasks and provide services on behalf of a cloud of the data centers.

The present disclosure provides a task scheduling/offloading method in the edge network to handle task distribution, offloading and management by applying a deep reinforcement learning model. Specifically, the task offloading problem is formulated as a multi-agent reinforcement learning problem. A decision-making process of each agent is modeled as a Markov decision process and a Q-learning approach configured to deal with a large scale of states and actions. The performance of the task offloading method is evaluated in a simulated environment of an edge computing network based on a simplified multi-armed bandit model. The task offloading method of the present disclosure outperforms the existing task offloading method and provides a lower latency for computation intensive tasks in the edge network.

BRIEF SUMMARY OF THE DISCLOSURE

One aspect or embodiment of the present disclosure includes an edge network computing system. The edge network computing system includes: a plurality of terminal devices, a plurality of edge servers connected to the terminal device through an access network, and a plurality of cloud servers connected to the plurality of edge servers through a core network. Each edge server is configured to: receive a plurality of computing tasks originated from one of the plurality of terminal devices; use a deep Q-learning neural network (DQN) with experience replay to select one of the plurality of could servers to offload a portion of the plurality of computing tasks; and send the portion of the plurality of computing tasks to the selected cloud server and forward results of the portion of the plurality of computing tasks received from the selected cloud server to the originating terminal device.

Another aspect or embodiment of the present disclosure includes a task offloading method for an edge server in an edge network computing system. The task offloading method includes: receiving a plurality of computing tasks from a terminal device, using a deep Q-learning neural network (DQN) with experience replay to select a could server to offload a portion of the plurality of computing tasks, and sending the portion of the plurality of computing tasks to the cloud server and forwarding results of the portion of the plurality of computing tasks received from the cloud server to the terminal device.

Another aspect or embodiment of the present disclosure includes computer-readable storage medium storing a computer program for task offloading. When being executed by an edge server, the computer program performs: receiving a plurality of computing tasks from a terminal device, using a deep Q-learning neural network (DQN) with experience replay to select a could server to offload a portion of the plurality of computing tasks, and sending the portion of the plurality of computing tasks to the cloud server and forwarding results of the portion of the plurality of computing tasks received from the cloud server to the terminal device.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
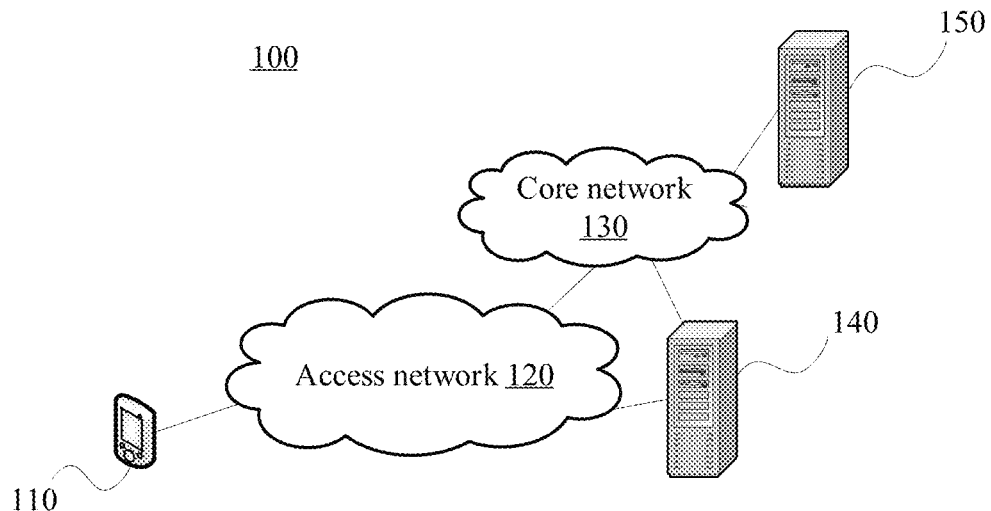
FIG. 1 depicts a schematic diagram illustrating an exemplary mobile edge computing system according to various disclosed embodiments of the present disclosure.

Reference will now be made in detail to exemplary embodiments of the disclosure, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the disclosure may be practiced.

These embodiments are described in sufficient detail to enable those skilled in the art to practice the disclosure and it is to be understood that other embodiments may be utilized and that changes may be made without departing from the scope of the disclosure. The following description is, therefore, merely exemplary.

Edge computing is distributed computing paradigm which brings computation and data storage closer to a location where they are needed to improve response time and save bandwidth. Despite improvements in network technology, data centers cannot always guarantee acceptable transfer rates and response time which could be critical requirements for most applications. The objective of the edge computing is to move the computation away from the data centers towards an edge of a cloud computing network, exploiting smart devices, mobile phones or network gateways to perform tasks and provide services on behalf of the cloud computing network. By moving services to the edge, it is possible to provide content caching, service delivery, storage and device management resulting in improved response time and transfer rates.

Mobile edge computing (MEC) is a new network paradigm that provides information technology services within a radio access network of mobile units (MUs). It is predicted that MEC will provide a new ecosystem to migrate intensive computing tasks of MUs. The MEC is located close to MUs and it is deployed within a Radio Access Network (RAN). Therefore, the MEC provides a higher bandwidth with a lower latency to improve Quality of Service (QoS) of the cloud computing network. In the 5G mobile network, the MEC plays an important role to satisfy the stringent delay requirement of the 5G standards.

However, the computation power of edge servers or edge devices may also be limited due to fast growing demand of network users and task loads. When tasks cannot be completely handled by the edge servers, the edge servers offload a portion of the task load to cloud servers at the data centers in the cloud computing network. In this case, it is important to reduce data transfer delays and data processing delays in the cloud computing network or backhaul network. The existing task offloading methods often select the cloud servers according to some static rules (e.g., minimum distance) and may cause substantial data transfer delays and/or data processing delays. On one hand, the static offloading rules are unable to adapt to time-varying network conditions. When data traffics and computation loads vary in the cloud computing network, any offload decision made without considering the time-varying network conditions may keep forwarding heavy data traffic to a node (i.e., a cloud server) that encounters congestion and may further aggravate the congestion at the node. The task offloading method consistent with the present disclosure senses the network conditions and actively avoids congested or busy cloud servers to reduce a task offloading cost. On the other hand, the existing task offloading methods often offload the tasks to a single cloud server. In this case, it is not possible to provide load balancing to the cloud servers. In other words, the edge server continues to offload the tasks to the same cloud server even if it already handles a heavy task load.

The present disclosure provides a mobile edge computing (MEC) server (hereinafter edge server) using deep reinforcement learning to help determining a target cloud server for tasks that need to be offloaded from an edge server. A multi-armed bandit model is used to simulate an MEC environment to evaluate task offloading performance. The simulation results indicate a QoS improvement in the MEC network.

FIG. 1 depicts a schematic diagram illustrating an exemplary edge network computing system according to various disclosed embodiments of the present disclosure. As shown in FIG. 1, the edge network computing system 100 includes a terminal device 110, an access network 120, a core network 130, an edge server 140, and a cloud server 150. Although only one terminal device 110, one edger server 140, and one cloud server 150 are shown in FIG. 1, a plurality of terminal devices, a plurality of edge servers, and a plurality of cloud servers may be present in the edge network computing system 100.

In some embodiments, the terminal device 110 originates and sends a task to the edge server 140 through the access network 120. The edge server 140 may process the task locally and return a result to the originating terminal device 110. In some other embodiments, depending on network conditions, the edge server 140 may offload the task to the cloud server 150 that is determined by the task offloading method. After completing the task, the cloud server 150 returns the result to the edge server 140 and the edge server 140 forwards the result to the originating terminal deice 110. The terminal device 110 communicates with the edge server 140 through the access network 120. The edge server 140 communicates with the cloud server 150 through the core network 130. In a process of processing the task, the cloud server 150 may communicate with the terminal device 110 directly or indirectly through the edge server 140.

Figure 2:
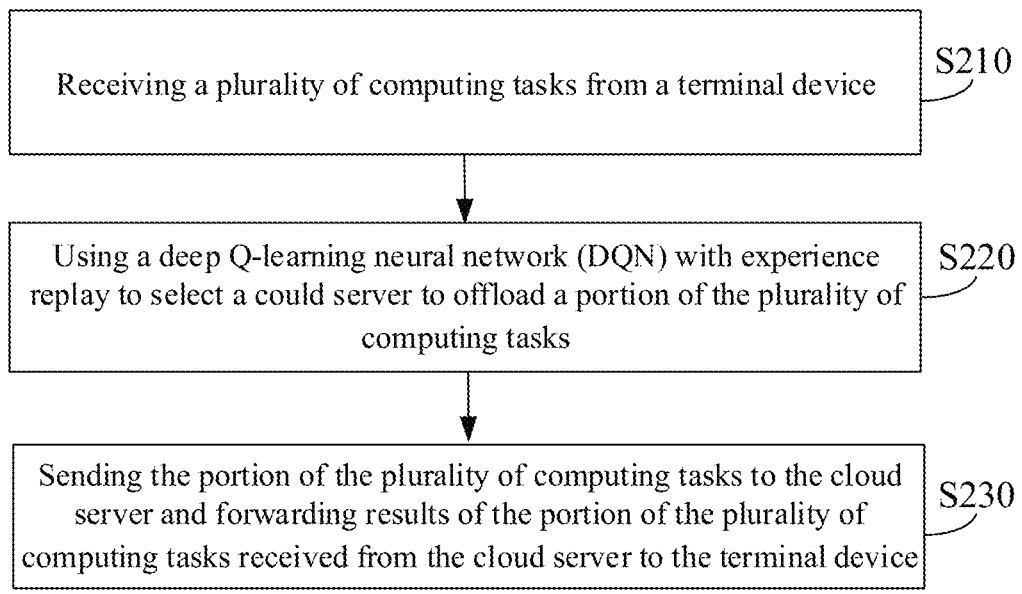
FIG. 2 depicts a schematic flowchart illustrating an exemplary task offloading method for an edge server in an edge network computing system according to various disclosed embodiments of the present disclosure.

The present disclosure also provides a task offloading method for an edge server in an edge network computing system. FIG. 2 depicts a schematic flowchart illustrating an exemplary task offloading method for an edge server in an edge network computing system according to various disclosed embodiments of the present disclosure. As shown in FIG. 2, the task offloading method includes the following processes.

At S210, a plurality of computing tasks is received by an edge server from a terminal device.

In some embodiments, the terminal device sends the plurality of computing tasks to an edge server through the access network connecting between the terminal device and the edge server. Generally, the edge server is located adjacent to the terminal device. The edge server may perform the computing tasks locally or may offload a portion of the plurality of computing tasks to a cloud server through the core network.

In some embodiments, the task offloading of the edge servers is formulated as a multi-agent reinforcement learning problem. Each edge server acts as an agent who makes a series of decisions on task offloading (specifically, cloud server selection) over time. The decision-making process of each agent is modeled as a Markov Decision Process (MDP).

In some embodiments, the edge network computing system includes K terminal devices indexed by $k \in \{1, \ldots, K\}$, M edge servers indexed by $m \in \{1, \ldots, M\}$, and J cloud servers indexed by $j \in \{1, \ldots, J\}$. Each edge server includes an agent, and at each time slot, the edge server m handles $N_m$ tasks indexed by $i \in \{1, \ldots, N_m\}$. Each of $N_m$ task has a size of input data $s_{m,i}$ and its complexity $z_{m,i}$, defined by a number of CPU cycles required to execute one bit of the task i. The number of CPU cycles required to complete the task i is $s_{m,i} z_{m,i}$, and the number of CPU cycles required to complete all the tasks at the edge server m is $\Sigma_{i=1}^{N_m} s_{m,i} z_{m,i}$.

To mitigate the computational load at the edge servers and guarantee timely processing of the plurality of computing tasks, a proportion of the plurality of computing tasks will be offloaded from the edge server m to the cloud server j. An association $x_{m,j}$ between the edge server m and the cloud server j is:

$$x_{m,j} = \begin{cases} 1, & \text{if the edge server } m \text{ offloads to the cloud server } j \\ 0, & \text{otherwise} \end{cases}$$

where m=1, M, and i=1, ..., $N_m$.

In some embodiments, each edge server only selects at most one cloud server for task offloading, that is, $\sum_{j=1}^{J} x_{m,j} \leq 1$. For example, the edge server m is associated with the cloud server j. The task assignment between the edge server m and the cloud servers is specified by the following:

$$a_{m,i} \text{ is } a_{m,j} = \begin{cases} 1, & \text{offloaded to a cloud server} \\ 0, & \text{executed by the edge server } m \end{cases}$$

where m=1, M, and i=1, . . . , $N_m$.

The time required for locally executing the tasks at the edge server m is given by the following:

$$t_{comp,m}^{(E)} = \frac{\sum_{i=1}^{N_m} (1 - a_{m,i}) s_{m,i} z_{m,i}}{c_m^{(E)}},$$

where $c_m^{(E)}$ is the computational capability of the edge server m measured in CPU cycles per second.

$c_j^{(C)}$ is the computational capability of the cloud server j that is available for the edge servers and is measured in CPU cycles per second. In one example, $c_j^{(C)}$ is a constant. In another example, $c_j^{(C)}$ fluctuates according to a Markov process. $c_j^{(C)}$ is allocated to the edge servers in a way such that all tasks offloaded from various edge servers associated with the cloud server j are completed at the same time.

The design rationale behind this allocation is that the computational capability is fully utilized. In other words, when the tasks that require less CPU cycles are completed sooner, the released computational capability will be used by other tasks that are still being executed. Under an optimal computational capability allocation that all tasks are completed at the same time, the computational capability allocated to a task is proportional to the number of CPU cycles required to execute the task. Note that the total number of CPU cycles for all tasks at the cloud server j is $\sum_{m=1}^{M} x_{m,j} \sum_{i=1}^{N_m} a_{m,i} s_{m,i} z_{m,i}$, the computational capability allocated to the task i at the edge server m by the cloud server j is given by the following:

$$c_{m,i}^{(C)} = \frac{a_{m,i} s_{m,i} z_{m,i}}{\sum_{m=1}^{M} x_{m,j} \sum_{i=1}^{N_m} a_{m,i} s_{m,i} z_{m,i}} c_j^{(C)}.$$

The execution time for all tasks offloaded to the cloud sever j is given by the following:

$$t_{comp,j}^{(C)} = \frac{a_{m,i} s_{m,i} z_{m,i}}{c_{m,j}^{(C)}} = \frac{\sum_{m=1}^{M} x_{m,j} \sum_{i=1}^{N_m} a_{m,i} s_{m,i} z_{m,i}}{c_j^{(C)}}.$$

The communication latency for offloading the tasks from the edge servers to the cloud servers includes an access latency and a data transmission latency. The access latency is a round-trip time for a packet to travel between the edge servers and the cloud servers, which is normally measured with "Ping" messages. The data transmission latency is a time spent on transmitting all the packets, which is determined by a size of transmitted data and a data rate of backhaul connection. Due to time-varying network dynamics, both the access latency and the data rate of backhaul connection fluctuate over time, and such fluctuation is expected to be memoryless. Note that, the access latency includes the uplink component (from the edge server to the cloud server) and the downlink component (from the cloud server to the edge server) of the access latency. In the edge network computing system, the two components are separated by a computing time at the cloud server, and the network dynamics may be changed during this period. Thus, the actual round-trip time could be different from the one measured by "Ping" messages. To obtain accurate round-trip time, the "Ping" message can be modified to record a total elapsed time from the beginning of task offloading to the completion of downloading outcome from the cloud server.

Then, the access latency is calculated by subtracting the data transmission time and the computing time from the total elapsed time. $t_{acc,m,j}^{(UL)}$ and $t_{acc,m,j}^{(DL)}$ are the time-varying uplink and downlink access latency of the backhaul connection between the edge server m and the cloud server j, respectively. Based on the memoryless property, $t_{acc,m,j}^{(UL)}$ and $t_{acc,m,j}^{(DL)}$ (m∈{1, . . . , M}, j∈{1, . . . , J}) follow a Markov process with a finite number of states. Each state corresponds to a certain range of $t_{acc,m,j}^{(UL)}$. Take $t_{acc,m,j}^{(UL)}$ as an example, a range of the possible values of $t_{acc,m,j}^{(UL)}$ are divided into multiple intervals with an equal length of l, given by $[t_{min}^{(UL)}, t_{min}^{(UL)}+l]$, $[t_{min}^{(UL)}+l, t_{min}^{(UL)}+2l]$, . . . , $[t_{max}^{(UL)}-l, t_{max}^{(UL)}]$, where $t_{min}^{(UL)}$ and $t_{max}^{(UL)}$ are the predefined minimum and maximum possible values of $t_{acc,m,j}^{(UL)}$ respectively, which can be set according to historical data of $t_{acc,m,j}^{(UL)}$. Given the interval length l, the total number of intervals is $(t_{max}^{(UL)} - t_{min}^{(UL)})/l$, which is also a number of states. $t_{acc,m,j}^{(UL)}$ is in state s if $t_{acc,m,j}^{(UL)}$ falls into the sth interval, i.e., $t_{acc,m,j}^{(UL)} \in [t_{min}^{(B)}+(s-1)l, t_{min}^{(B)}+sl]$. The Markov process for $t_{acc,m,j}^{(DL)}$ is defined in the same way as $t_{acc,m,j}^{(UL)}$. Note that the transition probabilities between different states are unknown to each edge server.

Similarly, $r_{m,j}^{(B)}$ is the data rate of the backhaul connection between the edge server m and the cloud server j. $r_{m,j}^{(B)}$ follows a Markov process with a finite number of states, given by $[r_{min}^{(B)}, r_{min}^{(B)}+l']$, $[r_{min}^{(B)}+l', r_{min}^{(B)}+2l']$, . . . , $[r_{max}^{(B)}-l', r_{max}^{(B)}]$, where $r_{min}^{(B)}$ and $r_{max}^{(B)}$ are the predefined minimum and maximum possible values of $r_{m,j}^{(B)}$, respectively, and l' is the length of each interval. Same as $t_{acc,m,j}^{(B)}$, $r_{m,j}^{(B)}$ is in state s' if $r_{m,j}^{(B)}$ falls into the s'th interval, i.e., $r_{m,j}^{(B)} \in [r_{min}^{(B)}+(s'-1)l', r_{min}^{(B)}+s'l']$.

With the data rate $r_{m,j}^{(B)}$ and the size of the data to be transmitted $\sum_{i=1}^{N_m} a_{m,j} s_{m,j}$, the data transmission latency from the edge server m to the cloud server j is $$t_{trans,m,j}^{(B)} = \frac{\sum_{i=1}^{N_m} a_{m,j} s_{m,i}}{r_{m,j}^{(B)}}.$$

A size of output data of a task is small (e.g., a decision indicator), the latency for sending the output data (i.e., the outcome) of the task back to the edge server is negligible. In case such latency is not negligible, the time for downloading the task output data can be calculated in the same way as the uploading time.

Given the access latency, data transmission latency, and the computational latency, the total elapsed time for offloading the tasks of the edge server m to cloud server j and completing these tasks is $t_{off,m,j}^{(B)} = t_{acc,m,j}^{(UL)} + t_{trans,m,j}^{(B)} + t_{comp,m,j}^{(C)} + t_{acc,m,j}^{(DL)}$. The time for executing the proportion of tasks at the edge server m is $$t_{comp,m}^{(E)} = \frac{\sum_{i=1}^{N_m} (1 - a_{m,i}) s_{m,i} z_{m,i}}{c_m^{(E)}} \cdot t_{m,j}$$

is the latency for completing all the tasks at the edge server m when associated with the cloud server j (i.e., $x_{m,j}=1$). Given that a proportion of the tasks are offloaded to the cloud server j and executed there, $t_{m,j}$ is impacted by the dependency of the tasks. Specifically, if all the tasks are independent of each other, they can be executed in parallel. Then, $t_{m,j}$ is determined by a latest set of tasks completed between the edge server m and the cloud server j, which is given by the following:

$$t_{m,j} = \max\{t_{off,m,j}^{(B)}, t_{comp,m}^{(E)}\}.$$

If the tasks are inter-dependent, they have to be executed following certain orders, making the calculation of $t_{m,j}$ more complicated. For example, the tasks of a training simulation system may include user device localization, map downloading and updating, image/video processing, trajectory prediction, and training outcome generation. The last task must rely on outcomes of previous tasks. A simple dependency pattern is considered, in which the tasks need to be executed sequentially. With such a dependency pattern, an output of one task is an input to a subsequent task. Based on the required order of execution, the set of tasks to be executed first (with proportion $\Sigma_{i=1}^{N_m}(1-a_{m,i})s_{m,i}z_{m,i}$) are assigned to be executed by the edge server m, and the remaining tasks (with proportion $\Sigma_{i=1}^{N_m}a_{m,i}s_{m,i}z_{m,i}$) are assigned to the cloud server j. Then, the output of the tasks executed by the edge server m is used as the input to start executing the tasks offloaded to the cloud server j. In this way, the computing at the edge server m and the offloading from the edge server m to the cloud server j can be performed in parallel, resulting in reduced latency. Under this setting, the time elapsed before the execution at the cloud server j is determined by the slower one between the computing at the edge server m and the offloading from the edge server m to the cloud server j, which is given by $\max\{t_{comp,m}^{(E)}, t_{acc,m,j}^{(UL)}+t_{trans,m,j}^{(B)}\}$. Finally, $t_{m,j}$ is calculated by the following:

$$t_{m,j} = \max\{t_{comp,m}^{(E)}, t_{acc,m,j}^{(UL)}+t_{trans,m,j}^{(B)}\}+t_{acc,m,j}^{(DL)}+t_{comp,m,j}.$$

The optimal task partitioning is achieved when $t_{off,m,j}^{(B)} = t_{comp,m}^{(E)}$ for independent tasks and $t_{comp,m}^{(E)}=t_{acc,m,j}^{(UL)}+t_{trans,m,j}^{(B)}$ for sequentially dependent tasks.

In some embodiments, the task offloading of the edge servers is formulated as a multi-agent reinforcement learning problem. Each edge server acts as an agent who makes a series of decisions on task offloading (specifically, cloud server selection) over time. The decision-making process of each agent is modeled as a Markov Decision Process (MDP). For the edge server m, a system state is defined by the observed UL and DL access latencies $t_{acc,m,j}^{(UL)}$ and $t_{acc,m,j}^{(DL)}$ and the backhaul data date $r_{m,j}^{(B)}$ observed at a current time slot. The system state observed by the edge server m at time t is specified by a 1×3 J vector $S_m(t)=[s_{m,1}^{(UL)}(t), \ldots, s_{m,J}^{(UL)}(t), s_{m,1}^{(DL)}(t), \ldots, s_{m,J}^{(DL)}(t), s'_{m,1}(t), \ldots, s'_{m,J}(t)]$, where $\{s_{m,j}^{(UL)}(t)\}$, $\{s_{m,j}^{(DL)}(t)\}$, and $\{s'_{m,j}(t)\}$ ($j \in \{1, \ldots, J\}$) are the states of $t_{acc,m,j}^{(UL)}$, $t_{acc,m,j}^{(DL)}$, and $r_{m,j}^{(B)}$ at time t, respectively. The action space of the edge server m is specified by a combination of two variables $\{A_m(t), B_m(t)\}$, which corresponds to the strategies of cloud server selection and task partitioning ratio of the edge server m. The association between the edge server m and various cloud servers is specified by a set of binary variables $[x_{m,1}(t), \ldots x_{m,J}(t)]$, where $x_{m,j}=1$ indicates that the edge server m offloads a proportion of tasks to the cloud server j and $x_{m,j}=0$ indicates otherwise. Given the constraint that at most one cloud server will be selected (i.e., $\Sigma_{j=1}^{J} x_{m,j} \leq 1$), the number of possible values of $A_m(t)$ is J+1 and can be indexed by the following:

$$A_m(t) = \begin{cases} j & \text{if the cloud server } j \text{ is selected} \\ 0 & \text{if no cloud server is selected} \end{cases},$$

where $m=1, \ldots, M$, and $j=1, \ldots, J$.

The proportion of tasks (measured in total required CPU cycles) to be offloaded to the cloud server j is given by $$\frac{\sum_{k=1}^{N_m} a_{m,i} s_{m,i} z_{m,i}}{\sum_{k=1}^{N_m} s_{m,i} z_{m,i}}.$$

Considering that the edge server m may receive different kinds of tasks over time, $$\frac{\sum_{k=1}^{N_m} a_{m,i} s_{m,i} z_{m,i}}{\sum_{k=1}^{N_m} s_{m,i} z_{m,i}}$$

may take any value between 0 and 1. Thus, if the value of $$\frac{\sum_{k=1}^{N_m} a_{m,i} s_{m,i} z_{m,i}}{\sum_{k=1}^{N_m} s_{m,i} z_{m,i}}$$

is directly set as the variable for task partitioning in the action space $$\left(\text{i.e., } B_m(t) = \frac{\sum_{k=1}^{N_m} a_{m,i} s_{m,i} z_{m,i}}{\sum_{k=1}^{N_m} s_{m,i} z_{m,i}}\right),$$

the dimension of action space would be extremely high. To reduce the complexity of training, $B_m(t)$ is set to take a relatively small number of discrete values between 0 and 1, e.g., $\{0, 0.1, 0.2, \ldots, 0.9, 1\}$. Once a certain value of $B_m(t)$ is selected, the task assignment is set such that $$\frac{\sum_{k=1}^{N_m} a_{m,i} s_{m,i} z_{m,i}}{\sum_{k=1}^{N_m} s_{m,i} z_{m,i}}$$

is the closest to the selected value of $B_m(t)$, $$\text{i.e., } \left|B_m(t) - \frac{\sum_{k=1}^{N_m} a_{m,i} s_{m,i} z_{m,i}}{\sum_{k=1}^{N_m} s_{m,i} z_{m,i}}\right|$$

is minimized. In this case, there is a tradeoff between performance and complexity when different resolution of $B_m(t)$ are selected. The reward of the edge server m at each time slot is set to be $-t_{m,j}$. The objective is to find the optimal policy that maximizes the expected long-term accumulated discounted reward.

Returning to FIG. 2, at S220, a deep Q-learning neural network (DQN) with experience replay is used for each edge server to select a cloud server to offload a portion of the plurality of computing tasks.

Each edge server includes a reinforcement learning (RL) agent aiming to learn from the environment and take action to maximize its long-term cumulative reward. The environment is modeled as an MDP with state space $\mathcal{S}$ and an RL agent can take actions from space $\mathcal{A}$. The agent interacts with the environment by taking actions, observing the reward and system state transition, and updating its knowledge about the environment. The objective of an RL algorithm is to find the optimal policy, which determines the strategy of taking actions under certain system states. A policy $\pi$ is specified by $\pi(s|a)=P(A_t=a|S_t=s)$. In general, a policy is in a stochastic form to enable exploration over different actions. To find the optimal policy, the key component is to determine the value of each state-action function, also known as Q-function, which is defined by the following:

$$Q(s_t, a_t) \leftarrow Q(s_t, a_t) + \alpha \left[ r_{t+1} + \gamma \max_{a_{t+1}} Q(s_{t+1}, a_{t+1}) - Q(s_t, a_t) \right].$$

Therefore, in large scale systems with large numbers of states and actions, the traditional Q-learning approach becomes infeasible since a table is required to store all the Q-values. In addition, traditional Q-learning needs to visit and evaluate every state-action pair, resulting in huge complexity and slow convergence. An effective approach to deal with such a challenge is to use a neural network (NN) to approximate the Q-values, given by $Q(s,a,w) \approx Q_\pi(s,a)$, where w are the weights of the NN. By training a NN with sampled data, the NN can map the inputs of state-action pairs to their corresponding Q-values.

At S230, the portion of plurality of computing tasks is sent to the cloud server and results of the portion of the plurality of computing tasks received by the edge server from the cloud server is forwarded by the edge server to the terminal device.

In some embodiments, each edge server corresponds to a DQN to be trained and the DQN is used to generate task offloading decisions once the training is completed. The input layer of the DQN is the current system state, which consists of 2 J neurons, each corresponds to an element of $S_m(t)$. The output layer is set to generate the values of Q-functions when taking all the J+1 actions, given by $Q(S_m(t),1), Q(S_m(t),2), \ldots, Q(S_m(t),J+1)$.

The direct application of NN in Q-learning may be unstable or even diverge due to the correlations between observations and the correlations between Q-values and target values. To deal with this challenge, a mechanism called experience replay is applied for the training of the DQN.

As described in the background section, due to the interaction between edge servers that share the computational resource of the same cloud server, the task offloading strategies of different edge servers are coupled, resulting in a multi-agent RL problem. A simple solution to such a problem is independent Q-learning (IQL), where each agent (edge server) regards the activities of other agents as part of the environment and learns the optimal policy based on the received rewards over time. In some embodiments, the edge servers learn to optimize the task offloading policies via the history of observed latency, hence gradually learn to select the proper cloud server. However, with IQL, all edge servers are learning and adjusting their policies simultaneously, the environment from the perspective of each edge server is non-stationary and there may be a Ping-Pong effect. For example, two edge servers may select the same cloud server at a time slot and experience high computational latency. Then, they select another same cloud server at the next time slot and observe high computational latency again. Hence, the system may take an extremely long time to converge.

To break such correlations, experience replay-based deep Q-network (DQN) is considered. The idea is to "freeze" the agent's experience for a certain time and use it to train the DQN later. Specifically, the agent first explores the environment by randomly taking actions and stores the experience, $e_t=(s_t, a_t, r_t, s_{t+1})$, in a target network. With the samples randomly drawn from the target network, the weights of the DQN is updated by minimizing the loss function given by the following:

$$L_i(w_i) = E_{(s,a,r,s') \in U(D)} \left[ \left( r + \gamma \max_{a'} Q(s', a', w_i^-) - Q(s, a, w_i) \right)^2 \right]$$

where $w_i$ and $w_i^-$ are weights of the DQN and the target network at iteration i, respectively.

Figure 3:
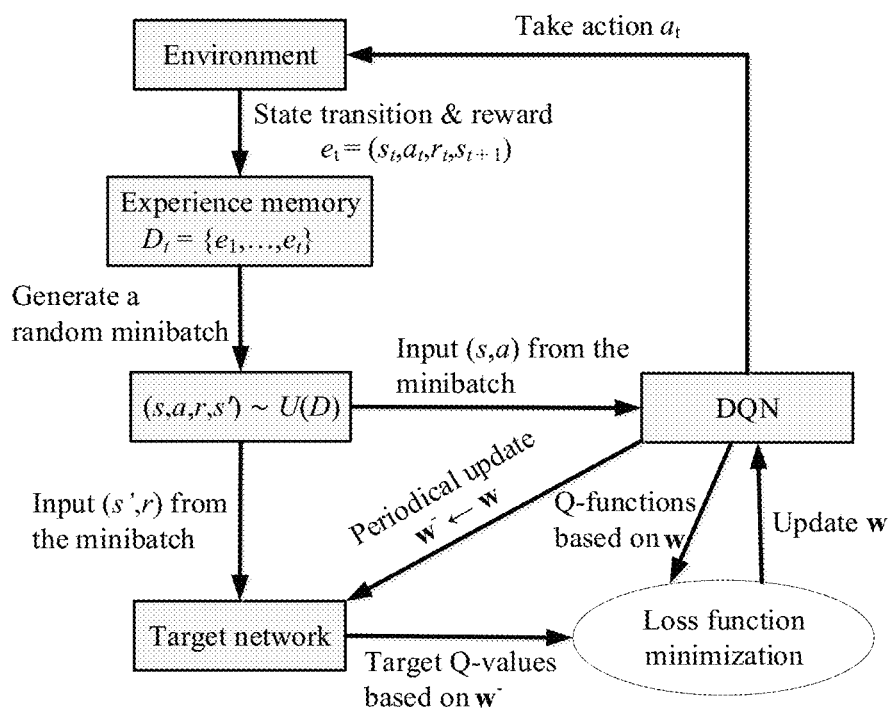
FIG. 3 depicts a schematic diagram illustrating an exemplary experience replay-based DQN training according to various disclosed embodiments of the present disclosure.

The loss function is the mean square error between DQN and target network, which can be minimized through stochastic gradient descent. To reduce the correlation between DQN and target network, the target network is updated less frequently. After the training of DQN, the agent then takes action based on the estimated Q-values. The framework of the experience replay based DQN training is shown in FIG. 3.

With experience replay-based training that "freezes" each agent's experience, the edge servers are not interacting with each other at the same pace and unable to learn from instantaneous feedback. As a result, the experience replay may be unstable, causing the system fail to converge. To stabilize training and accelerate convergence, a key observation is that the environment observed by an single unit (SU) can be made stationary conditioned on the policies of other SUs. However, given that samples generated by experience replay are obsolete (i.e., cannot reflect current system dynamics), the edge servers may not be able to disambiguate the age of the sampled data from the replay memory. Importance sampling with off-environment training is an effective approach to tackle this issue. The idea of importance sampling is assigning an importance ratio (or weight) to each sample in a minibatch. More recent experiences have greater weights and less recent experiences have smaller weights to naturally decay obsolete experiences.

In the embodiments of the present disclosure, the deep reinforcement learning algorithm is applied to the edge network computing system. Each edge server includes a reinforcement learning agent. The state space includes the access latency and the back haul data rate. The action space includes the strategies of cloud server selection and the task partitioning ratio. Each edge server corresponds to a DQN trained to generate task offloading decisions. Thus, the optimal policy is used to make task offloading decisions.

The performance of the task offloading method consistent with the present disclosure is evaluated through simulation. The model used for evaluation is called multiarmed bandit model. The objective of the model is to maximize the expected total reward over some time period. In a k-armed bandit problem, each of the k actions that has an expected or mean reward is given. The goal of the agent is to select a proper action form that maximizes the long-term expectation of the reward. In some embodiments, the objective turns to choose a proper target cloud server that minimize the latency for each arrived task. The evaluation includes the following assumptions. The edge server and the cloud servers are undistinguishable, i.e., the task offloading method considers that the edge sever and the cloud servers have the same distribution of the latency. The task offloading does not affect the distribution of the latency, i.e., the task offloading decision does not affect the environment. The latencies of the edge server and the cloud servers are uniformly distributed, as well as the randomness of latency for each of the edge server and the cloud servers. As the RL algorithms maximize the reward, the optimal policy for the task offloading in the edge network computing system is intended to achieve a minimum latency. The relation between the latency and the reward is $R=e^{-T}$, where R is an immediate reward, and T is a latency in second.

To simulate the scenario where the distribution of the latency changes, two perturbations are added at t=300 and t=600, where, a congestion occurs at t=300 on the connection between the edge server and the cloud server which is the best initial task offloading target (or the computational resource in the edge server is exhausting, and the latency increases). At t=600, a small random perturbation in the MEC system occurs. The best action may or may not change at this time.

The strategy of the naïve algorithms is simply testing every action at the beginning of each run and selects the sever which has the shortest latency. The selected server is used throughout the simulation process. This strategy outperforms at the beginning of the simulation process but fails when the distribution of the latency changes due to lack of flexibility. Both sample average and constant step-size c-greedy algorithms are able to select the suboptimal sever when the best original link is congested or select new optimal sever when a small random perturbation occurs in the system. However, the constant step-size c-greedy algorithm is more resilient to both perturbations. As such, the constant step-size c-greedy algorithm is adaptive to a non-stationary environment.

According to the simulations, the constant step-size c-greedy algorithm shows good performance on adaptively selecting the best servers for incoming tasks even the distribution of the latency in the system changes. It is also observed that the RL method performs well for task offloading in the edge network computing environment. However, the task offloading decisions do not affect the latencies of future tasks. In some other embodiments, the multi-armed bandit model is replaced with deep Q-learning to explore removal of the assumptions and further performance improvement.

The present disclosure provides the task offloading method based on the deep reinforcement learning for the computation intensive tasks within the edge network computing environment. The detailed design and the model description are provided with mathematical analysis and modeling. The simulation environment is built to conduct the simplified validation and evaluation experiment to verify the performance of the task offloading method. Preliminary simulation results show that the task offloading method outperforms the existing task offloading strategies.

The present disclosure also provides a computer-readable storage medium. The computer-readable storage medium stores a computer program. When being executed by an edge sever, the computer program implements the embodiments of the task offloading method shown in FIG. 2. The description thereof is omitted.

The computer-readable storage medium may be an internal storage unit of the edge server described in any of the foregoing embodiments. For example, the computer-readable storage medium may be a hard disk or an internal memory of the device. The computer-readable storage medium may also be an external storage device of the device, such as a plug-in hard disk, a smart media card (SMC), a secure digital (SD) card, a flash card, etc. The computer-readable storage medium may also store the computer program, and other programs and data required by the edge server. The computer-readable storage medium may also temporarily store already outputted data or to-be-outputted data.

Those skilled in the art should understand that all or part of the processes in the foregoing method embodiments can be implemented by instructing relevant hardware through a computer program. The computer program may be stored in the computer-readable storage medium, and when being executed, the computer program implements the processes of the foregoing method embodiments. The storage medium may be a magnetic disk, an optical disk, a read-only memory (ROM), or a random-access memory (RAM).

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. An edge network computing system, comprising:
a plurality of terminal devices;
a plurality of edge servers comprising at least one processor connected to the plurality of terminal devices through an access network; and
a plurality of cloud servers connected to the plurality of edge servers through a core network,
wherein each edge server is configured to:
receive a plurality of computing tasks originated from one of the plurality of terminal devices;
use a deep Q-learning neural network (DQN) with experience replay to select one of the plurality of cloud servers to offload a portion of the plurality of computing tasks, such that each edge server selects an offloading cloud server without being correlated to selection of the offloading cloud server by other edge servers;
send the portion of the plurality of computing tasks to the selected cloud server; and
execute the portion of the plurality of computing tasks and forward results of the portion of the plurality of computing tasks received from the selected cloud server to the originating terminal device;
wherein:
a first time is a time for completing a remaining portion of the plurality of computing tasks performed by one of the plurality of edge servers;
a second time is a time for offloading and completing the portion of the plurality of computing tasks offloaded to the selected cloud server, and includes an uplink access latency, a data transmission time for transmitting the portion of the plurality of computing tasks from one of the plurality of edge servers to the selected cloud server, a computing time for completing the portion of the plurality of computing tasks by the selected cloud server, and a downlink access latency;

when the plurality of computing tasks are independent of each other, a total time for completing the plurality of computing tasks is the greater of the first time and the second time, and an optimal task partitioning is achieved when the first time is equal to the second time;

when the plurality of computing tasks are required to be performed sequentially, the total time for completing the plurality of computing tasks includes the greater of the first time and a sum of the uplink access latency and the data transmission time, the computing time, and the downlink access latency, and the optimal task partitioning is achieved when the first time is equal to the sum of the uplink access latency and the data transmission time;

each edge server includes an agent of multi-agent reinforcement learning in a Markov decision process (MDP), and the agent learns from an environment, and takes action to maximize a long-term accumulative reward;

a state space includes the uplink access latency, the downlink access latency, and a data rate of a backhaul link between the edge server and the cloud server, observed at a current time slot;

an action space includes the plurality of cloud servers as candidates for task offloading, and a task partitioning ratio having a number of discrete values; and a reward includes minus the total time for completing the plurality of computing tasks.

2. The system according to claim 1, wherein when using the deep Q-learning neural network (DQN) with experience replay to select the cloud server to offload the portion of the plurality of computing tasks to the cloud server, the edge server is configured to:

each time after receiving a plurality of computing tasks, use the DQN to determine a cloud server and a task partition ratio to offload some of the plurality of computing tasks to the cloud server;

store each experience including a current state, a current action, a current reward, and a next state in a replay memory;

randomly select a minibatch of past experiences from the replay memory to input to the DQN and a target network;

optimize the DQN with updated weights based on Q-values from the DQN and Q-values from the target network; and periodically update weights of the target network with the weights of the DQN.

3. The system according to claim 2, wherein:

the DQN includes an input layer of neurons representing the state space and the action space, and an output layer of Q-values for the state space and the action space at the input layer;

training the DQN includes mapping inputs of state-action pairs in the minibatch of past experiences to their corresponding Q-values by approximating Q-values and minimizing a loss function of mean square error between the Q-values outputted by the DON and the Q-values outputted by the target network; and the target network includes a structure same as the DQN and weights periodically updated by the weights of the DQN obtained from training.

4. The system according to claim 2, wherein:

each experience stored in the replay memory includes an importance weight to naturally decay obsolete data.

5. The system according to claim 1, wherein:

the edge network computing system is a mobile edge computing system;

the plurality of terminal devices are mobile devices; and the plurality of mobile devices are connected to the plurality of edge servers through a radio access network.

6. A task offloading method for an edge server comprising at least one processor in an edge network computing system, comprising:

receiving a plurality of computing tasks from a terminal device;

using a deep Q-learning neural network (DQN) with experience replay to select a cloud server to offload a portion of the plurality of computing tasks;

sending the portion of the plurality of computing tasks to the cloud server; and executing the portion of the plurality of computing tasks and forwarding results of the portion of the plurality of computing tasks received from the cloud server to the terminal device;

wherein:

a first time is a time for completing a remaining portion of the plurality of computing tasks performed by one of the plurality of edge servers;

a second time is a time for offloading and completing the portion of the plurality of computing tasks offloaded to the selected cloud server, and includes an uplink access latency, a data transmission time for transmitting the portion of the plurality of computing tasks from one of the plurality of edge servers to the selected cloud server, a computing time for completing the portion of the plurality of computing tasks by the selected cloud server, and a downlink access latency;

when the plurality of computing tasks are independent of each other, a total time for completing the plurality of computing tasks is the greater of the first time and the second time, and an optimal task partitioning is achieved when the first time is equal to the second time;

when the plurality of computing tasks are required to be performed sequentially, the total time for completing the plurality of computing tasks includes the greater of the first time and a sum of the uplink access latency and the data transmission time, the computing time, and the downlink access latency, and the optimal task partitioning is achieved when the first time is equal to the sum of the uplink access latency and the data transmission time;

each edge server includes an agent of multi-agent reinforcement learning in a Markov decision process (MDP), and the agent learns from an environment, and takes action to maximize a long-term accumulative reward;

a state space includes the uplink access latency, the downlink access latency, and a data rate of a backhaul link between the edge server and the cloud server, observed at a current time slot;

an action space includes the plurality of cloud servers as candidates for task offloading, and a task partitioning ratio having a number of discrete values; and a reward includes minus the total time for completing the plurality of computing tasks.

7. The method according to claim 6, wherein using the deep Q-learning neural network (DQN) with experience replay to select the cloud server to offload the portion of the plurality of computing tasks to the cloud server includes:
- each time after receiving a plurality of computing tasks, using the DQN to determine a cloud server and a task partition ratio to offload some of the plurality of computing tasks to the cloud server;
- storing each experience including a current state, a current action, a current reward, and a next state in a replay memory;
- randomly selecting a minibatch of past experiences from the replay memory to input to the DQN and a target network;
- optimizing the DON with updated weights based on Q-values from the DQN and Q-values from the target network; and
- periodically updating weights of the target network with the weights of the DQN.

8. The method according to claim 6, wherein:
- the DQN includes an input layer of neurons representing the state space and the action space, and an output layer of Q-values for the state space and the action space at the input layer;
- training the DQN includes mapping inputs of state-action pairs in the minibatch of past experiences to their corresponding Q-values by approximating Q-values and minimizing a loss function of mean square error between the Q-values outputted by the DON and the Q-values outputted by the target network; and
- the target network includes a structure same as the DQN and weights periodically updated by the weights of the DQN obtained from training.

9. The method according to claim 6, wherein:
- each experience stored in the replay memory includes an importance weight to naturally decay obsolete data.

10. The method according to claim 6, wherein:
- the edge network computing system includes a plurality of terminal devices, a plurality of edge servers, and a plurality of cloud server;
- the plurality of terminal devices are connected to the plurality of edge servers through an access network; and
- the plurality of edge servers are connected to the plurality of cloud server through a core network.

11. The method according to claim 10, wherein:
- the edge network computing system is a mobile edge computing system;
- the plurality of terminal devices are mobile devices; and
- the plurality of mobile devices are connected to the plurality of edge servers through a radio access network.

12. A non-transitory computer-readable storage medium storing a computer program for task offloading, when being executed by an edge server comprising at least one processor, the computer program performing:
- receiving a plurality of computing tasks from a terminal device;
- using a deep Q-learning neural network (DQN) with experience replay to select a cloud server to offload a portion of the plurality of computing tasks;
- sending the portion of the plurality of computing tasks to the cloud server; and
- executing the portion of the plurality of computing tasks and forwarding results of the portion of the plurality of computing tasks received from the cloud server to the terminal device;

wherein:
- a first time is a time for completing a remaining portion of the plurality of computing tasks performed by the edge server;
- a second time is a time for offloading and completing the portion of the plurality of computing tasks offloaded to the cloud server, and includes an uplink access latency, a data transmission time for transmitting the portion of the plurality of computing tasks from the edge server to the cloud server, a computing time for completing the portion of the plurality of computing tasks by the cloud server, and a downlink access latency;
- when the plurality of computing tasks are independent of each other, a total time for completing the plurality of computing tasks is the greater of the first time and the second time, and an optimal task partitioning is achieved when the first time is equal to the second time;
- when the plurality of computing tasks are required to be performed sequentially, the total time for completing the plurality of computing tasks includes the greater of the first time and a sum of the uplink access latency and the data transmission time, the computing time, and the downlink access latency, and the optimal task partitioning is achieved when the first time is equal to the sum of the uplink access latency and the data transmission time;
- each edge server includes an agent of multi-agent reinforcement learning in a Markov decision process (MDP), and the agent learns from an environment, and takes action to maximize a long-term accumulative reward;
- a state space includes the uplink access latency, the downlink access latency, and a data rate of a backhaul link between the edge server and the cloud server, observed at a current time slot;
- an action space includes a plurality of cloud servers as candidates for task offloading, and a task partitioning ratio having a number of discrete values; and
- a reward includes minus the total time for completing the plurality of computing tasks.

13. The non-transitory computer-readable storage medium according to claim 12, wherein using the deep Q-learning neural network (DQN) with experience replay to select the cloud server to offload the portion of the plurality of computing tasks to the cloud server includes:
- each time after receiving a plurality of computing tasks, using the DQN to determine a cloud server and a task partition ratio to offload some of the plurality of computing tasks to the cloud server;
- storing each experience including a current state, a current action, a current reward, and a next state in a replay memory;
- randomly selecting a minibatch of past experiences from the replay memory to input to the DQN and a target network;
- optimizing the DQN with updated weights based on Q-values from the DQN and Q-values from the target network; and
- periodically updating weights of the target network with the weights of the DQN.

14. The non-transitory computer-readable storage medium according to claim 12, wherein:
  the DQN includes an input layer of neurons representing the state space and the action space, and an output layer of Q-values for the state space and the action space at the input layer;
  training the DQN includes mapping inputs of state-action pairs in the minibatch of past experiences to their corresponding Q-values by approximating Q-values and minimizing a loss function of mean square error between the Q-values outputted by the DQN and the Q-values outputted by the target network; and
  the target network includes a structure same as the DQN and weights periodically updated by the weights of the DQN obtained from training.

* * * * *